United States Patent

[11] 3,596,112

| [72] | Inventor | Terrance D. Nelson<br>Milwaukee, Wis. |
|---|---|---|
| [21] | Appl No | 885,895 |
| [22] | Filed | Dec. 17, 1969 |
| [45] | Patented | July 27, 1971 |
| [73] | Assignee | Allen-Bradley Company<br>Milwaukee, Wis. |

[54] NOISE-ISOLATED TRIGGER SIGNAL GENERATOR FOR MOTOR CONTROL
6 Claims, 2 Drawing Figs.

[52] U.S. Cl. ............................................. 307/252 J,
307/252 N, 307/252 W, 307/262, 307/269, 323/22
SC, 323/22 T, 328/83
[51] Int. Cl. ....................................................... H03k 17/00
[50] Field of Search .......................................... 307/252 J,
252 N, 252 W, 262, 283, 284, 269, 305; 323/22 R,
22 SC, 22 T; 328/66, 67, 76, 78, 80, 83

[56] References Cited
UNITED STATES PATENTS

| 3,315,098 | 4/1967 | Eckl | 307/252 W |
|---|---|---|---|
| 3,328,606 | 6/1967 | Pinckaers | 307/252 W |
| 3,418,497 | 12/1968 | Sauter et al. | 307/252 N |
| 3,493,835 | 2/1970 | Hellmann | 307/252 W |

Primary Examiner—Stanley D. Miller, Jr.
Attorneys—Thomas O. Kloehn and Arthur H. Seidel

ABSTRACT: A trigger signal is generated from a DC power supply responsive to a full wave rectified synchronizing signal in phase with the motor current and a varying DC control signal. The synchronizing signal is fed to a base of an NPN transistor to periodically discharge a storage capacitor. The control signal is fed to a base of another NPN transistor in a transistor switching circuit which is also connected to the storage capacitor, which in one embodiment operates between an oscillator capacitor and the power supply, and which in the other embodiment operates in a shunt path around the oscillator capacitor. A transformer couples the trigger signal from the oscillator.

INVENTOR
TERRANCE D. NELSON

BY Thomas O. Kloehn
ATTORNEY

NOISE-ISOLATED TRIGGER SIGNAL GENERATOR FOR MOTOR CONTROL

BACKGROUND OF THE INVENTION

Vulnerability to electrical noise resulting in misfiring has been a persistent problem with trigger signal generators for motor controls. This vulnerability has been particularly troublesome because such trigger signal generators are usually connected in circuits with a large number of other motor starters and associated industrial electrical equipment all of which tend to generate noise and transients throughout the circuit. Also electrical equipment in close proximity can transmit noise by induction into the motor control circuit, and noise from the motor itself can leak back into the control circuit causing it to misfire.

The prior art responds to this problem with a variety of devices calculated either to prevent the generation of noise, or to eliminate it from the circuit. For example, one source of troublesome spurious signals is the field of a contactor coil at dropout, and it has been customary to place large R-C circuits across such coils to dissipate the fields. However, no commercially practical means is available for effectively eliminating enough noise, and attempts to approximate that condition have proven prohibitively expensive.

SUMMARY OF THE INVENTION

The present invention relates to a trigger signal generator for triggering a controller in a power line, and more specifically the invention resides in the combination of a unidirectional power supply, a synchronizing signal source powered by the power supply and controlled by a pulsating input signal the frequency of which is proportional to that of the power to be controlled, a summing circuit which receives a variable control signal of magnitude proportional to the desired trigger signal output and which is connected to the synchronizing signal source to respond as a switching circuit to the resultant of an arithmetic combination of the synchronizing signal and the control signal, and an output oscillator which is connected to the power supply and to the summing circuit to be actuated thereby to provide a trigger signal output.

A trigger signal generator embodying the invention described in the foregoing paragraph is immune to the effects of noise of such power and duration as may be provided for by the design parameters of the circuitry and components employed. The present invention isolates the output trigger signal from the noisy input signals so that the noise may be precluded from the output trigger signal. Such noise as may ride the synchronizing signal or the control signal will be blocked for the time required to charge the capacitor in the output oscillator. Thus the present invention obviates the need to attempt to prevent the generation of, or to eliminate the presence of noise on the circuit and it achieves this by isolating the trigger signal generator from the effects of the inevitably present noise.

DESCRIPTION OF THE PREFERRED EMBODIMENTS

Figure 1:
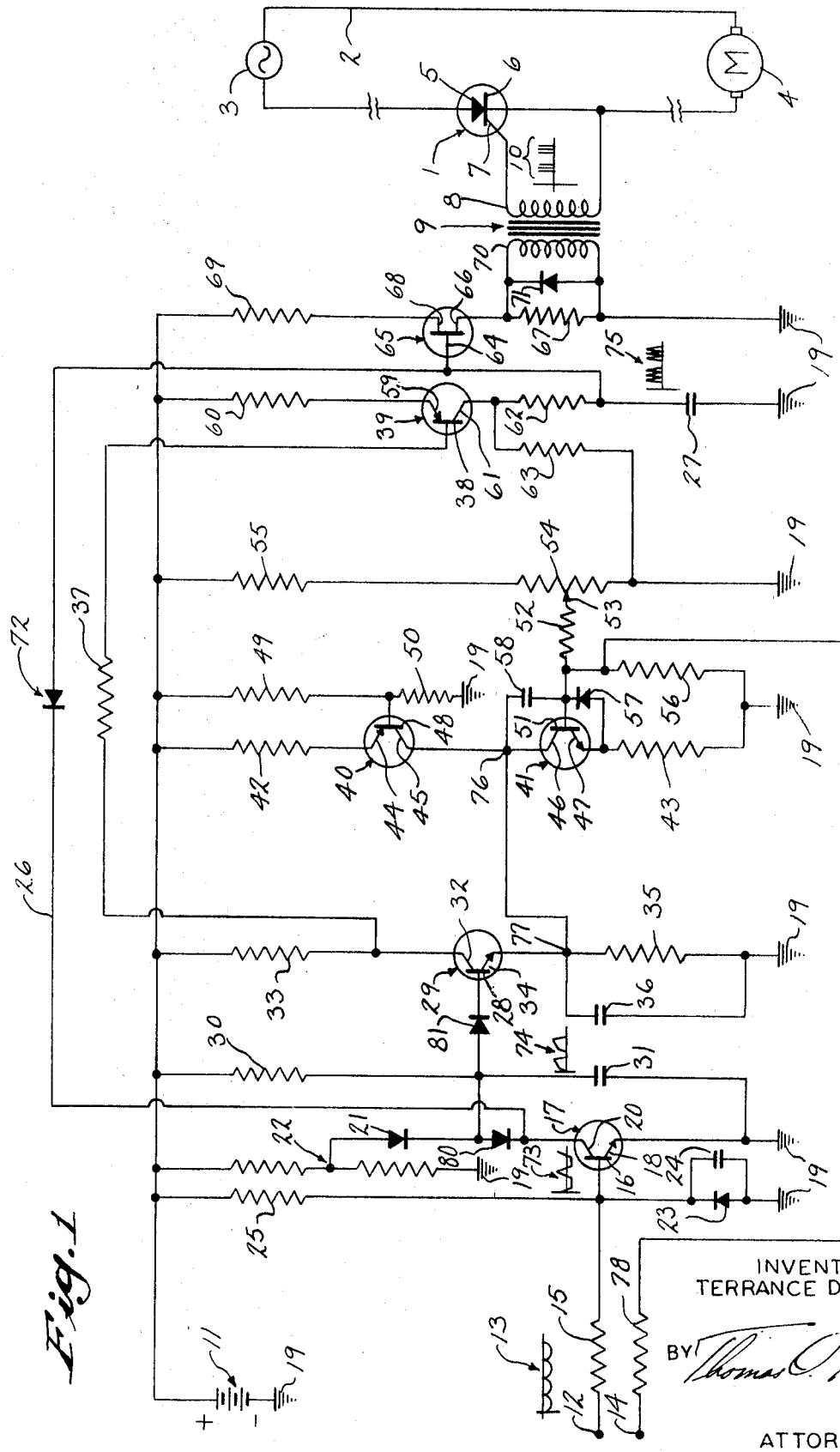
FIG. 1 is a schematic diagram of an SCR firing circuit embodying the present invention.

The schematic diagrams of both preferred modes of practicing the invention shown in the drawings have the components so arranged that the input signal terminals and the power supply are on the left, and the output is on the right. Both embodiments of the invention are intended to trigger a silicon controlled rectifier (hereafter SCR 1), that is a controller in a power line 2 between an AC power source 3 and a motor 4 to control the average power to the motor 4 and thus to control the operation of the motor 4. (The power line 2 would, in many applications, be a three wire three phase line and to represent that situation the line 2 is broken on both sides of the SCR 1.) The SCR 1 has an anode 5, a cathode 6 and a gate 7, the gate-7-to-cathode-6 circuit being connected across a secondary 8 of an output transformer 9, which is the output coupling device employed by both embodiments, to receive a train of triggering pulses 10 that are graphically represented adjacent to the secondary 8. A train of triggering pulses, such as the triggering pulses 10 which are visually represented in the graph 10 adjacent to the output transformer 9 in the drawing, is preferred over a single pulse to ensure firing of the SCR 1, since a single pulse could conceivably appear on the gate 7 at a time when the line potential across the anode 5 to cathode 6 circuit is not sufficient, for one reason or another, to permit the SCR 1 to be fired. The power transmitted to the motor 4 from the power source 3 depends upon the firing angle or time of the SCR 1 in each half cycle when the polarity across the SCR 1 permits it to conduct; if the SCR 1 is fired late in the half cycle relatively little power will be transmitted to the motor 4, but if the SCR 1 is fired early in the cycle, maximum or close to maximum power will be transmitted to the motor 4. It is the function of both embodiments of the present invention to transmit to the gate 7 a train of triggering pulses 10 at precisely that time during the conductive half cycle of the SCR 1 such that the power transmitted to the motor 4 from the source 3 will be commensurate with the needs of the motor 4 to achieve or maintain a desired operation.

Figure 2:
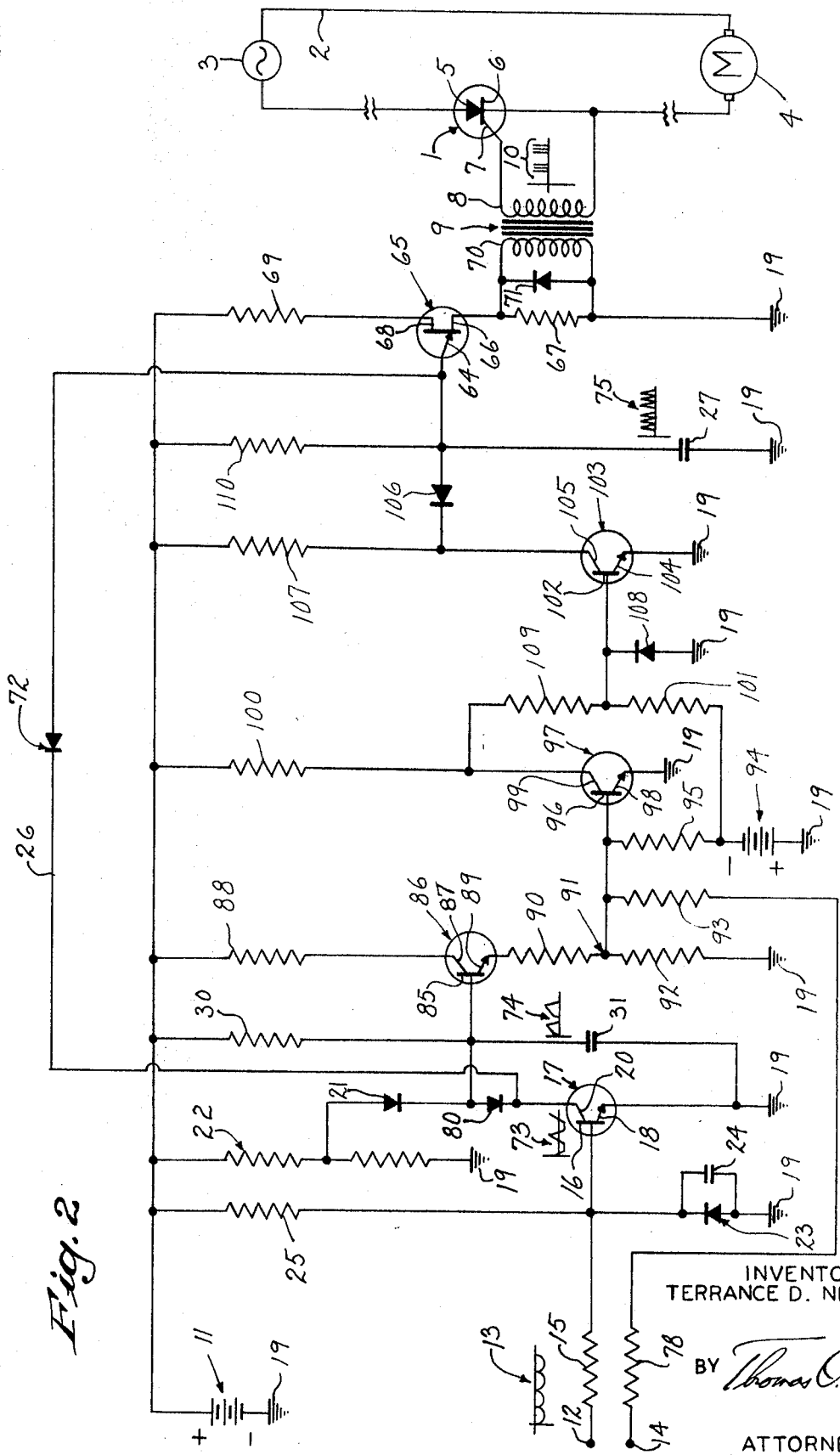
FIG. 2 is a schematic diagram of a second SCR firing circuit embodying the present invention.

At the input ends of the circuits of both embodiments is a unidirectional power supply 11, which is represented by the symbol for a battery in the upper left-hand corner of FIGS. 1 and 2, for the generator. The DC power supply 11 has its negative pole connected to a common ground 19 and its positive pole connected to a common conductor. Beneath the power supply 11 in both FIGS. 1 and 2 is an input signal terminal 12, to which will be fed a negative, unidirectional, pulsating input signal 13 which has the same frequency and phase as the AC signal in the power line 2 from the AC source. The pulsating input signal 13 is an unfiltered, full-wave rectified sample of the AC power on the line 2 thus appearing as a series of negative half sinusoids, but a half-wave rectified sample could be used with appropriate circuit modifications, as could any form of a pulsating or pulsed signal of the proper frequency and phase. The pulsating input signal 13 is visually represented in the graph 13 just above the input signal terminal 12.

Beneath the input signal terminal 12 in both FIGS. 1 and 2, a control input terminal 14 is represented, and it will receive a DC control signal that varies in magnitude to provide a potential magnitude proportional to the power needs of the motor 4 to achieve or maintain a desired mode of operation. The use of a variable unidirectional control signal in the preferred embodiment makes it compatible with the system in which it is to be used. Of course, the circuits of these embodiments of the invention are specifically designed to receive and interpret the particular control signal anticipated from the system in which it is to be used.

In both embodiments, the input signal terminal 12 is on that portion of the circuit that may be considered a synchronizing signal source, and it is connected through a resistance 15 to a base 16 of an NPN transistor 17 that functions as a switch in a shunt path. This shunting transistor 17 has its emitter 18 connected to the common ground 19 and its collector 20 connected through a blocking diode 80 and a switching diode 21 to the voltage divider 22 that is connected between the power supply 11 and the common ground 19. The base 16 of the shunting transistor 17 is also connected through a parallel network, made up of a blocking diode 23 and a filter bypass capacitor 24, to the common ground 19 and through a resistance 25 to the power supply 11. The collector 20 of the shunting transistor 17 is also connected to a discharge conductor 26 for an oscillator capacitor 27. The emitter-18-collector-20 circuit of the shunting transistor 17 is connected across the plates of a storage capacitor 31 to discharge the storage capacitor 31 periodically. The storage capacitor 31 is charged by the generator's power supply 11 through a time constant resistor 30, which is connected between the storage capacitor 31 and the power supply 11, and, part of the time, through the switching diode 21 and the voltage divider 22, which are connected in parallel with the time constant resistor 30.

In both embodiments the oscillator capacitor 27 is the energy storage device for an output oscillator. The output oscillator is a relaxation oscillator, which sees the entire circuit to the left of it in the drawings as a controllable DC source for the output oscillator. The oscillator capacitor 27 discharges through a unijunction transistor 65, which serves as the nonlinear device of the output oscillator, when the charge on the capacitor 27 reaches the predetermined peak point voltage. The unijunction transistor 65, which has its emitter 64 connected to the oscillator capacitor 27, has a base-one 66 connected through a resistance 67 to the common ground 19 and a base-two 68 connected through a resistance 69 to the power supply 11. A primary winding 70 of the output coupling transformer 9 is connected across the resistance 67 that joins the base-one 66 of the unijunction transistor 65 to the common ground 19, and a freewheeling diode 71 that blocks negative voltage transients is connected in parallel with both the primary 70 and the resistance 67. The oscillator capacitor 27 discharge conductor 26, which connects the oscillator capacitor 27 to the emitter 64 of the unijunction transistor 65 and to the collector 20 of the shunting transistor 17, contains a blocking diode 72 between the unijunction transistor 65 and the shunting transistor 17 back toward the unijunction transistor 65 and the oscillator capacitor 27.

The two embodiments differ in the circuitry between the output oscillator at one end and the unidirectional power supply 11, the synchronizing signal source and control signal input terminal 14 at the other end. The distinctive circuitry, which lies in the middle of each diagram, may be considered a form of summing circuit which receives the DC control signal and arithmetically combines it with the output of the synchronizing signal source to control the charging of the oscillator capacity 27 by the unidirectional power supply 11. In both embodiments the summing circuit functions in a switching mode to determine the time during each cycle of the pulsating input signal 13 when the oscillator capacitor 27 is energized by the unidirectional supply 11.

In neither embodiment is the specific utilization of any single circuit component, taken alone, new or unique. The contribution lies in the circuit as a whole. Therefore, to comprehend the invention, the specific components must be considered in a generalized sense; that is, the transistors described are but specific forms of controllable current valves with the base sections serving as control elements and in some instances these current valves operate in a switching mode like a relay and in others they function as a variable resistance, the unijunction transistor 65 serves as one type of nonlinear device, some type of which every relaxation oscillator needs, etc. To make and use this invention, it is not necessary to employ exactly those components described in these two embodiments, but anyone skilled in the art will recognize that any of the wide variety of current valves capable of operating in the mode described may be substituted for the component specifically mentioned here.

In the first embodiment shown in FIG. 1, the synchronizing signal source is connected to the summing circuit through the connection of the storage capacitor 31 to a base 28 of a summing transistor 29, which serves to control the generation of a trigger signal output. Also the summing transistor 29 has its collector 32 connected through a resistance 33 to the positive pole of the unidirectional power supply 11, and its emitter 34 is connected at a junction 77 to a voltage drop resistor 35, the other end of which is connected to the common ground 19. A bypass filter capacitor 36 connects the emitter 34 of the control transistor to ground 19 in parallel with the voltage drop resistor 35. The collector 32 of the control transistor 29 is connected through a current limiting resistor 37 to a base 38 of an oscillator input transistor 39 to control the conductivity of the oscillator input transistor 39.

This embodiment employs a stabilized command signal source which has a PNP transistor 40 and an NPN transistor 41 connected in series with a pair of current limiting resistors 42 and 43 across the power supply 11 to the common ground 19. The PNP transistor 40 has its emitter section 44 connected through the current limiting resistor 42 to the power supply 11, and its collector 45 is connected to a collector 46 of the NPN transistor 41 at a junction 76. The NPN transistor 41 has an emitter 47 which is connected through the current limiting resistor 43 to the common ground 19. The PNP transistor 40 functions primarily as a fixed resistance by having its base 48 connected between a pair of voltage dividing resistors 49 and 50 that are series connected across the power supply 11 to the common ground 19, but it can also perform a stabilizing function since its conductivity is responsive to temperature and variations in the power supply 11.

The NPN transistor 41 functions as a variable resistor across the power supply 11 that is responsive to the control input signal on the control input terminal 14. To operate thus, the NPN transistor 41 has its base 51 connected through a resistor 78 to the control input terminal 14 and tied to the common ground 19 through a drop resistor 56. The base 51 is also connected through a current limiting resistor 52 to a movable contact 53 on a biasing potentiometer 54, which is connected in series with a current limiting resistor 55 across the power supply 11 to ground 19. A shunt limiting diode 57 connects the emitter 47 of the variable divider transistor 41 to its base 51 to shunt off any excess reverse biasing signals, and a negative feedback capacitor 58 connects the collector 46 of the variable divider transistor 41 to suppress the effect of noise appearing at the base section 51.

The junction 76 of the collectors 45 and 46, respectively, of the command source transistors 40 and 41 is connected in common with the junction 77 to the emitter 34 of the summing transistor 29 to the drop resistor 35. This common connection of the two junctions 76 and 77 places the summing transistor 29 in a parallel network with the fixed command transistor 40, and the drop resistor 35 in a parallel network with the variable command transistor 41, and these two parallel networks are connected in series across the power supply 11 to ground. If both the summing transistor 29 and the variable command transistor 41 are turned off, i.e., nonconductive, the common voltage level of the junctions 76 and 77, and thus of the emitter 34 of the summing transistor 29, is fixed by the constant voltage drops across the series arranged fixed command transistor 40 and the drop resistor 35 (the bypass capacitor 36 serving only to shunt noise). When the variable command transistor 41 is turned on, its conductivity reduces the potential level of the common junction 76 and 77 by reducing the voltage drop across the parallel network, which is made up of the command transistor 41 and the drop resistor 35, between the common junctions 76 and 77 and the common ground 19. Since the conductivity of the variable command transistor 41 is responsive to the control signal from the control input terminal 14, the potential level of the emitter 34 of the summing transistor 29 is also made responsive to the control signal, but the emitter 34 is isolated from noise on the control signal. Since the conductivity of the summing transistor 29 depends upon current flow across its base-28-to-emitter-34 circuit, and since the potential of this summing transistor 29 relative to the synchronized firing signal 74 on its base depends on the command signal on the common junctions 76 and 77, the conductivity time of the summing transistor 29 in each cycle of the synchronizing input signal 13 as reflected in the charge curve 74 of the storage capacitor 31 also is responsive to the control input signal.

An oscillator input transistor 39, which has its base 38 connected to the collector 32 of the transistor 29, controls the charging of the oscillator capacitor 27 by the power supply 11. The oscillator input transistor 39 is a PNP transistor having its emitter 59 connected through a current limiting resistor 60 to the power supply 11, and its collector 61 connected through a current limiting resistor 62 to the oscillator capacitor 27.

The collector 32 of the summing transistor 29 is connected to a base 38 of an oscillator input switching transistor 39, which is a PNP transistor 39. The oscillator input transistor 39 has its emitter 59 connected through a resistor 60 to the power supply 11 and its collector 61 connected through a time constant resistor 62 to the oscillator capacitor 27. With the oscillator input switching transistor 39 thus connected in series between the power supply 11 and the oscillator capacitor 27, and the conductivity of the oscillator input switching transistor 39 being controlled by the summing transistor 29, the charging of the oscillator capacitor 27 is controlled by the conductivity of the summing transistor 29, which depends on the difference between the charge level on the storage capacitor 31 and the level of junction 76 and 77, which is voltage signal proportional to the control input signal. A noise discharge path is provided for the oscillator capacitor 27 through a current limiting resistor 63 which is connected between ground 19 and a point between the current limiting resistor 62 and the oscillator capacitor 27, to discharge the oscillator capacitor 27 should noise cause the summing transistor 29 to conduct for an instant prematurely. Such premature firing of the control transistor 29 could otherwise cause a small charge to accumulate on the oscillator capacitor 27.

In the second embodiment, the synchronizing signal source is connected to the summing circuit by connecting the storage capacitor 31 to a base 85 of an NPN transistor 86, which has its collector 87 connected through a current limiting resistor 88 to the power supply 11 and its emitter 89 connected through a resistor 90 to a summing junction 91, which in turn is connected through a resistor 92 to the common ground 19. The summing junction 91 is also connected through a current limiting resistor 93 and the resistor 78 to the control input terminal 14. In addition, a negative bias supply 94 is connected through a current limiting resistor 95 to the summing junction 91. Finally, the summing junction 91 is also connected to a base 96 of a shunt control transistor 97, which has its emitter 98 connected to the common ground 19 and its collector 99 connected through a current limiting resistor 100 to the power supply 11.

The transistor 86 functions as a continuously conducting current valve due to the negative bias on its emitter 89 from the negative bias supply 94 which is connected to the summing junction 91. The varying magnitude of the control signal from the control signal input terminal 14 is algebraically summed with the negative bias at the summing junction 91. Hence the conductivity of the transistor 86 which varies directly with the synchronizing signal from the storage capacitor 31, varies inversely with the potential level at the summing junction 91, which is a function of the algebraic sum of the input control signal, the negative bias and the voltage drop across the resistors 92 due to the conductivity of the transistor 86. The shunt control transistor 97 functions as a switch which is normally biased to be nonconductive, but as a potential level of the summing junction 91 rises due to the factors mentioned in the previous sentence, the shunt control transistor 97 is switched on.

The negative bias supply 94 is also connected through a current limiting resistor 101 to a base 102 of an NPN oscillator shunt transistor 103, which operates in a switching mode, to bias the oscillator shunt transistor 103 into a normally closed, i.e., conducting, state. The oscillator shunt transistor 103 has its emitter 104 connected through the common ground 19 and its collector 105 connected through a blocking diode 106 to the oscillator capacitor 27 and through a current limiting resistor 107 to the power supply 11. The blocking diode 106 is oriented to present a low resistant shunt path about the oscillator capacitor 27, but to block any current from the power supply to the oscillator shunt transistor 103 that would otherwise charge the oscillator capacitor 27. A protective diode 108 is connected between the common ground 19 and the base 102 of the oscillator shunt transistor 103 to protect the base circuit of the oscillator shunt transistor 103. The base 102 of the oscillator shunt transistor 103 is also connected through a voltage drop resistor 109 to the collector 99 of the shunt control transistor 97. Thus when the shunt control transistor 97 is switched on by the rise in potential level of the summing junction 91, it provides a low resistant shunt path around the base 102 of the oscillator shunt transistor 103, and due to the voltage drop resistor 109 the potential level of the base 102 of the oscillator shunt transistor 103 will be driven negative. Since the oscillator shunt transistor 103 is an NPN transistor, when the negative potential is imposed on its base 102 it is switched to a nonconductive state presenting an open circuit condition in the shunt path about the oscillator capacitor 27. This allows the oscillator capacitor 27 to charge through a time constant resistor 110 by which it is conducted to the power supply 11. The charging of the oscillator capacitor 27 will send the output oscillator into oscillation, as in the previous embodiment and as represented by the graph 75, to provide the output signal as described in the previous embodiment and as represented in the graph 10 in the drawing.

In these embodiments, the unidirectional power supply 11 is a 15 volt DC power source. The negative, pulsating input signal 13, which is imposed on the synchronizing input terminal 12, and the varying DC control input signal, which is imposed on the control signal input terminal 14, have magnitudes commensurate with the 15-volt output of the trigger signal source 11. The DC control signal may be the error signal output of the feedback control circuit (not shown) that compares a feedback signal proportional to the speed of the motor 4 with a reference signal proportional to a desired speed, and generates an error signal, which is the unidirectional control signal, that is proportional to the difference between the feedback signal and the reference signal. However, the unidirectional control signal could come directly from a speed control potentiometer, or some other such device. Commonly both the synchronizing signal 13 and the control signal coming in on the control signal input terminal 14 will carry considerable noise, the effects of which are eliminated by the present invention.

When the synchronizing signal 13 is at zero potential, or close to zero potential, the shunting transistor 17, being an NPN transistor 17, is conductive and in its conductive state it provides a discharge path for the oscillator capacitor 27 and for the storage capacitor 31. As the synchronizing input signal goes negative, it turns off the shunting transistor 17, rendering it nonconductive, so that the oscillator capacitor 27 can be charged and so that the storage capacitor 31 will begin to charge. The potential level across the base-16-to-emitter-18 junction of the shunting transistor 17 is visually represented by the graph 73, which is drawn adjacent to the transistor 17.

As soon as the shunting transistor 17 turns off, the storage capacitor 31 begins charging through both the current limiting resistor 30 and through the voltage divider 22 in series with the switching diode 21. As the charge continues to build up on the storage capacitor 31, it reaches a level where the switching diode 21 is reversed biased, blocking that path of charge current, and the charging of the storage capacitor 31 proceeds thereafter through the current limiting resistor 30 alone. This is represented in the graph 74 adjacent to the storage capacitor 31, where the storage capacitor 31 charge curve is shown with a knee in it, the initial portion being a rapid charge, which abruptly drops to a slower charge rate at the knee when the switching diode 21 is reverse biased. When the synchronizing signal 13 approaches zero potential once again, the shunting transistor 17 is rendered conductive and the storage capacitor 31 rapidly discharges through the shunting transistor 17, as illustrated in the graph 74 adjacent to the storage capacitor 31.

The conductivity of the summing transistor 29 is determined by the potential drop across its base-28-to-emitter-34 junction, so that conductivity depends upon the relative potential levels of the storage capacitor 31, which is connected to its base 28, and the common junctions 76—77 which are connected to its emitter 34. The variable DC control signal on the control signal input terminal 14 controls the conductivity of the variable command transistor 41, the collector 46 of which is connected in common with the drop resistor 35 by the common junctions 76—77 to the emitter 34 of the summing transistor 29 to present a voltage level proportional to the DC control signal. Since the variable command transistor 41 is an NPN transistor 41, its conductivity will increase as its base second 51 is driven to higher positive potentials, a floor having been set for the potential level of the base 51 of the variable transistor 41 by adjustment of the movable contact 53 on the biasing potentiometer 54. If a strong control signal appears on the control signal input terminal 14, it will drive the base 51 of the variable command transistor 41 highly conductive, thus reducing the potential level of the common junctions 76—77 at the emitter 34 of the summing transistor 29. If the input signal on the base 51 is not strong enough to turn-on the variable command transistor 41, the potential level of the common junctions 76—77 will be set at a high level by the current through the drop resistor 35, which is the full current load conducted by the fixed command transistor 40. In short, the conductivity of the variable command transistor 41 varies directly with the magnitude of the control input signal, but the potential level of common junctions 76—77 (and hence that of the emitter 34) varies inversely with the conductivity of the variable command transistor 41. However, the lower the potential level of the emitter 34, the sooner in each synchronizing signal 13 the summing transistor 29 conducts, so that the summing transistor 29 responds to the difference between the synchronizing signal and a signal proportional to the control input signal.

The pulsating input signal 13 may include transients and noise, some of which is filtered to the common ground 19 through the filter bypass capacitor 24 that is connected between the base 16 of the shunting transistor 17 and the common ground 19. The remaining noise is blocked by the time constant of the storage capacitor 31 and the resistors 22 and 30 in its charge paths. As soon as the charge on the storage capacitor 31 reaches a potential level sufficiently in excess of the voltage drop across the drop resistor 35 so that the base 28 of the summing transistor 29 is positive with respect to the emitter 34, the summing transistor 29 is turned-on. When the summing transistor 29 conducts, it drops the potential level of the base section 38 of the oscillator input transistor 39, which is a PNP transistor and which is therefore rendered conductive, and current begins to flow from the power supply 11 through the current limiting resistor 60, the oscillator input transistor 39 and the current limiting resistor 62 to charge the oscillator capacitor 27.

When the charge on the oscillator capacitor 27 reaches the peak point voltage for the emitter 64 to base-one 66 circuit of the unijunction transistor 65, the unijunction transistor 65 turns on, presenting a very low resistance discharge path to the oscillator capacitor 27 and the oscillator capacitor 27 discharges rapidly through the unijunction transistor 65. Hence, the charge on the oscillator capacitor 27, which is visually represented in the adjacent graph 75, appears as a series of narrow spikes of equal magnitude beginning at a desired time in each cycle of the pulsating input signal 13. Each discharge of the oscillator capacitor 27 through the unijunction transistor 65 produces a spike in the train of triggering pulses 10 across the secondary 8 of the output transformer 9. As soon as the oscillator capacitor 27 is discharged, the unijunction transistor 65 turns off ceasing to conduct emitter 64-to-base-one 66 current to allow the oscillator capacitor 27 to be recharged through the oscillator input transistor 39. The oscillator capacitor 27 will continue to be recharged until the input transistor 39 ceases to conduct, which will occur when the summing transistor 29 ceases to conduct, and the summing transistor 29 is turned off when the storage capacitor 31 is discharged through the shunting transistor 17 at the end of each half cycle. As the storage capacitor 31 discharges through the shunting transistor 17, the oscillator capacitor 27 will also be discharged of any residual charge through the blocking diode 72 in the discharge conductor 26 and the shunting transistor 17.

To summarize, the storage capacitor 31 charges continuously, and it is discharged periodically by the shunting transistor 17 under the influence of the pulsating input signal 13. The storage capacitor 31 thus periodically imposes synchronizing signals 74 of uniform configuration on the base 28 of the summing transistor 29. The potential level of the emitter 34 of the summing transistor 27 varies inversely with the magnitude of the control input signal on the control input terminal 14, and as the potential level of the emitter 34 falls, the base-28-to-emitter-34 circuit reaches a conductive voltage gradient at progressively earlier times in the cycles of the synchronizing signals 73 on the base 28 and the summing transistor 29 conducts soon and longer. The conductivity of the oscillator input transistor 39 varies directly with the conductivity of the summing transistor 29. When the oscillator input transistor 39 conducts, trigger signals 10 appear across the output transformer 9 which is the output coupling device employed in this embodiment. Since the synchronizing signal 74 from the charge capacitor 31 to the base 28 of the summing transistor 29 is synchronized with the line power on the line 2 from the generator 3, the conductivity of the summing transistor 29 is likewise synchronized and so is the trigger signal output 10 of the output oscillator. Thus the firing time or angle of the control transistor 29 controls the firing or angle of the SCR1 controlling the motor 4.

Such noise and transients as may be introduced in the system along with the pulsating input signal 13 and the DC control signal appearing on the control signal input terminal 14 are isolated from the output relaxation oscillator. This results primarily from two features of this circuit. First, the output oscillator 27 is powered entirely by the generator power supply 11 which may be a noise free source entirely independent of the pulsating input signal 13 and the control signal. Although noise and transients on either the pulsating input signal 13 or the control signal may affect the conductivity of the summing transistor 29 and thus the conductivity of the oscillator input transistor 39, this eventuality is removed by firing the summing transistor 29 with the charge on the storage capacitor 31, which blocks out noise or transients. Thus the effect of the noise or transients is nullified, or at least delayed to the point where it would appear in the triggering pulses 10 only if the noise or transients were of excessively long duration and of excessively high power. By varying the parameters of the circuit, a trigger signal generator according to the present invention can be designed to be immune from virtually any noise anticipated in whatever system it is to be used, thus eliminating the expense of attempting to prevent the generation of noise or eliminating it from the circuit.

The operation of the synchronizing signal generator including the shunting transistor 17 in the second embodiment is the same as described above in connection with the first embodiment, and the description of the operation of the synchronizing signal source need not be repeated. The same is true of the output oscillator, including the oscillator capacitor 27, the unijunction transistor 65 and the output coupling circuitry.

The coupling transistor 86 to which the storage capacitor 31 is connected serves primarily as an impedance matching device which couples the synchronizing signal source to the summing junction 91. Due to the negative bias on the emitter 89 of that NPN coupling transistor 86, the coupling transistor 86 conducts continuously, but its conductivity increases and decreases with the synchronizing signal 74 imposed on its base 85 by the synchronizing signal source. As the conductivity of the coupling transistor 86 fluctuates, the potential level of the summing junction of 91 likewise fluctuates since its potential level will be the algebraic sum of the voltage drop across the resistor 92 in series with the coupling transistor 86 plus the negative bias reduced by the limiting resistor 95 plus the positive control signal from the control input terminal 14.

The negative bias source 14 would tend to keep the shunt control transistor 97 in a nonconductive state, but the potential level of the summing junction 91 controls the conductivity of the shunt control transistor 97 and the negative bias supply 94 represents only one of the three potential sources combined to make up the potential level of the summing junction 91. Thus when a positive control signal of predetermined magnitude appears on the control input terminal 14, it will have the effect of driving the base 96 of the NPN shunt control transistor 97 sufficiently positive to render the shunt control transistor 97 conductive at a predetermined time in the cycle of the synchronizing input signal 74. When the shunt control transistor 97 conducts, it shorts out the circuit from the power supply 11 to the bias supply 94 through the resistors 109 and 101 around the shunt control transistor 97. This has the effect of driving the base 102 on the oscillator shunt transistor 103 negative, and since the oscillator shunt transistor 103 is an NPN transistor 103, the negative potential of its base 102 will render it nonconductive thus presenting an effective open in the shunt circuit about the oscillator capacitor 27. With the shunt path about the oscillator capacitor 27 open, the generator power supply 11 can then charge the oscillator capacitor 27 through the time constant resistor 110 with the resulting oscillation of the output oscillator as was described in connection with the previous embodiment.

The manner in which this embodiment is isolated from noise and the pulsing input signal 13 is described above in connection with the first embodiment. It must be anticipated that noise will also appear on the control signal input terminal 14 but this embodiment likewise tends to isolate the trigger signal 10 output from that noise. The noise could only be effective be advancing or retarding the time in each cycle when the trigger signal output 10 is generated. The time when the trigger signal output 10 is generated depends upon the time when the predetermined charge is built up on the oscillator capacitor 27. The charging of the oscillator capacitor 27 is controlled by its own capacitance and the value of the time constant resistor 110 and by the sum at the summing junction of the synchronizing signal 74, the negative bias from the negative bias source 94 and the control input signal from the terminal 14. A sufficiently large transient on the control signal could cause a premature firing of the shunt control transistor 97 which in turn would instantaneously open the shunt path about the oscillator capacitor 27. Inasmuch as the opening of the shunt path would be instantaneous only, the effect of the noise is negated by the time constant of the charging circuit of the oscillator capacitor 27. Thus a spurious charge of brief duration would be drained out through the discharge conductor 26 before the next synchronizing signal 74 is generated, or through the blocking diode 106 and the shunting transistor 103 when the shunt path is once more closed. In any event, such a transient would have no effect on the trigger signal output 10 of the generator. Thus, to practice this embodiment of the invention to achieve a stated operating specification, it is necessary only to know the magnitude and duration of transients likely to appear on the pulsing input terminal 12 and the control signal input terminal 14, and then to calculate the time constants of the charging circuits for the storage capacitor 13 and the oscillator capacitor 27 and to select the appropriate shunt control transistor 97 and negative bias source 94. When the proper circuit parameters are thus calculated and implemented in the concrete embodiment, the imposed operating specification will be satisfied.

The foregoing description of the invention sets forth the manner and process of making and using it in sufficiently clear, concise and exact terms as to enable any person skilled in the art to which it pertains, or which it is most nearly connected to make and use the same, and it also sets forth the best mode presently contemplated by the inventor for carrying out his invention. By contrast, however, the subject matter which the applicant specifically regards as his invention is particularly pointed out and distinctly claimed in the claims that follow.

I claim:

1. A trigger signal generator to provide a trigger signal for triggering an electrical controller in an AC power line, the trigger signal generator comprising the combination of:
   a power supply providing unidirectional current for said trigger signal generator;
   a synchronizing signal source including a terminal to receive a pulsating input signal of frequency proportional to the frequency on said AC power line, a controllable current valve having a control element connected to said terminal so that its conductivity is controlled by said pulsating input signal and a storage capacitor connected to said power supply and to said controllable current valve to be charged and discharged responsive to the conductivity of the controllable current valve;
   an output oscillator including a trigger signal output means, an oscillator capacitor connected to be charged by said power supply and a nonlinear device connected to said oscillator capacitor and to said trigger signal output means to conduct a trigger signal to said output means when the charge on said oscillator capacitor exceeds a predetermined value;
   and a summing circuit including an input terminal receiving a control input signal of magnitude proportional to desired conductivity of said controller in said AC power line, and a switching circuit connected to said storage capacitor and to said input terminal to control the charging of said oscillator capacitor responsive to the resultant of a combination of signal proportional to said charge on said storage capacitor and to said control input signal.

2. A trigger signal generator as set forth in claim 1 wherein:
   said controllable current valve in said synchronizing signal source is connected across said storage capacitor so as to provide a shunt discharge path around said storage capacitor when said controllable current valve is conductive.

3. A trigger signal generator as set forth in claim 2 wherein:
   said storage capacitor is connected through parallel conductive paths to said power supply, and one of said conductive paths contains a resistor and a diode between said resistor and said storage capacitor to be reverse biased when said charge on said storage capacitor reaches a predetermined level to block said one conductive path to said power supply.

4. A trigger signal generator as set forth in claim 1 wherein:
   said summing circuit contains a first controllable current valve having a control element connected to said storage capacitor, a second controllable current valve connected between said power supply and said oscillator capacitor and having a control element connected to said first control valve, and a command signal source connected to receive said control input signal and connected to said first controllable current valve to vary the potential level of said first controllable current valve relative to said storage capacitor proportionately to said control input signal.

5. A trigger signal generator as set forth in claim 4 wherein:
   said first controllable current valve is a transistor having as its control element a base and having its emitter-collector circuit connected across said power supply, and said command signal source includes a pair of complementary transistors connected in series across said power supply and parallel to said first controllable current valve with a base of one of said pair of complementary transistors connected to receive a fixed base current and the other of said complementary transistors having its base section connected to receive said control input signal, and a junction between said complementary transistors being connected to an emitter of said first controllable current valves.

6. A trigger signal generator as set forth in claim 1 wherein:
   said summing circuit includes a summing junction coupled to said storage capacitor and connected to receive said control input signal, a bias supply connected to said summing junction, a first controllable current valve connected across said power supply and having a control element connected to said summing junction, and a second controllable current valve connected across said oscillator capacitor to provide a shunt path for discharging said oscillator capacitor and having a control element connected to said bias supply and to said first controllable current valve to be normally conductive when said first controllable current valve is nonconductive and to be nonconductive when said first controllable current valve is conductive.